Patented July 30, 1940

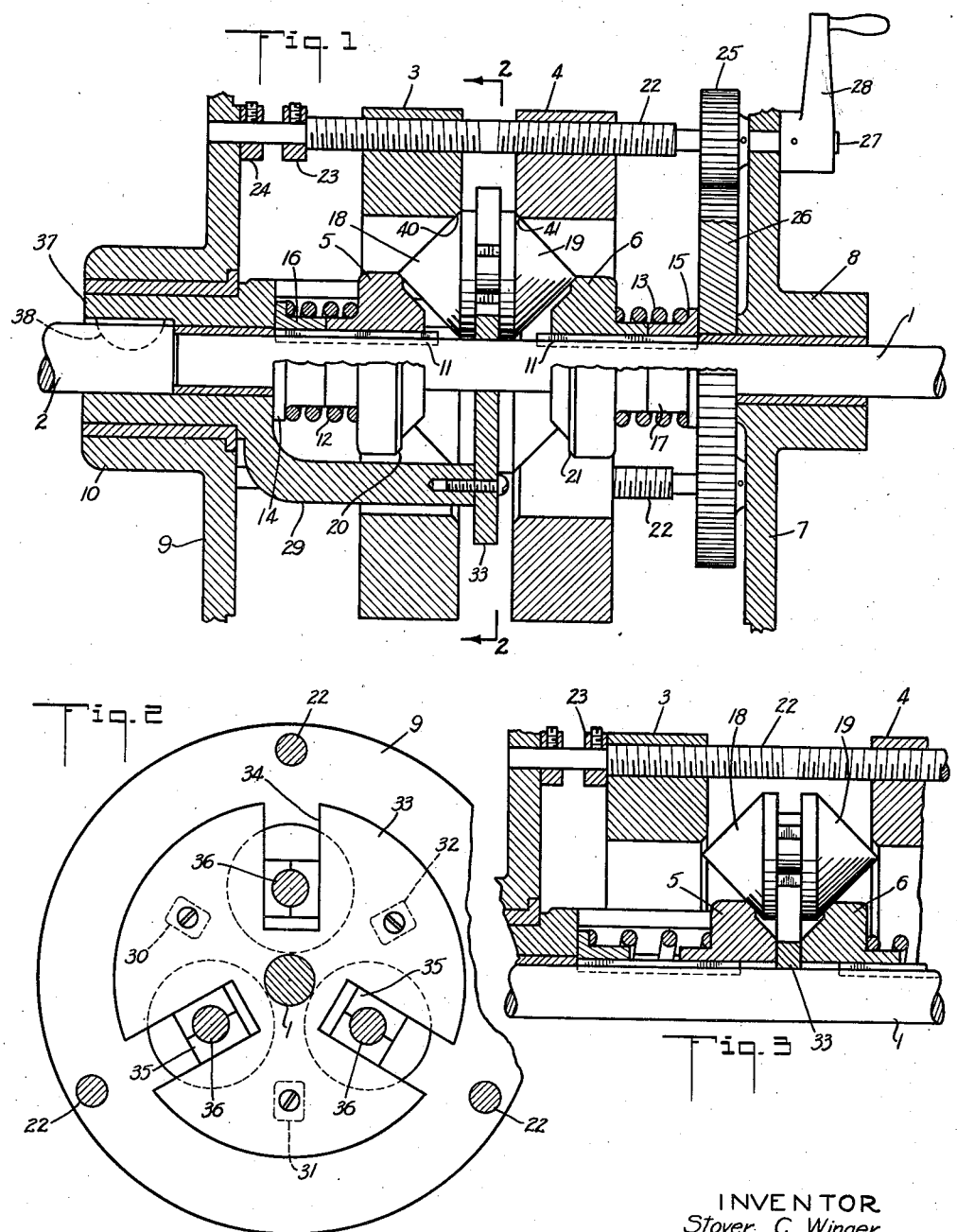

2,209,497

UNITED STATES PATENT OFFICE 2,209,497

VARIABLE RATIO TRANSMISSION

Stover C. Winger and Leslie K. Loehr, Los Angeles, Calif., assignors to Guy H. Hall, Los Angeles, Calif.

Application August 23, 1938, Serial No. 226,302

8 Claims. (Cl. 74—281)

This invention relates to a transmission mechanism, the ratio of which may be varied in a continuous manner; and without the necessity of interrupting the transfer of power between the driving and the driven elements.

It is one of the objects of this invention to provide a drive of this character that is compact and inexpensive.

In order to conform to these requirements, this invention utilizes a planetary motion between wheels having frictional driving surfaces, and so arranged that the effective diameters of at least some of the wheels in the planetary system may be varied in a continuous manner. It is accordingly another object of this invention to provide a planetary system of this character in which the wheels are compactly arranged, and in which the ratio may be adjusted even while the device is in operation.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is a longitudinal view mainly in section, of an embodiment of the invention, the adjustment of the apparatus being for maximum ratio;

Fig. 2 is a sectional view, taken along plane 2—2 of Fig. 1; and

Fig. 3 is a fragmentary sectional view, similar to Fig. 1, but illustrating another adjustment of the apparatus.

In Fig. 1 a pair of coaxial wheel elements is shown, so arranged that they each define grooves. One wheel element is formed by the aid of the two sections 3 and 4 which between them form the groove having the sloping sides 40 and 41. The other wheel element is formed by the pair of wheel sections 5 and 6, which between them form a groove having sloping sides 20 and 21. In driving contact with these grooves are one or more wheel structures, each having a pair of tapered or conical portions 18, 19. These structures, as will be hereinafter described, are caused to follow a planetary path about the common axis, and thereby to drive a driven shaft, such as shaft 2. Another shaft 1, coaxial therewith, may be the driving shaft. However, either shaft 1 or shaft 2 may be the driven shaft, the other shaft being the driving shaft. In the present instance we shall assume that shaft 1 is the driving shaft.

Appropriate means may be provided for rotatably supporting these shafts. For example, a frame work is indicated, having a side flange 7 and a central boss 8 through which the shaft 1 may pass for supporting it at the right hand end of the apparatus. Similarly, flange 9 and boss 10 at the left hand end of the apparatus are indicated for rotatably supporting that part of the apparatus which is driven by shaft 1 by aid of the wheel elements 3—4 and 5—6, and the wheel structures 18—19.

Thus for example the wheel sections 5 and 6 may be splined as by splines 11 to the shaft 1 so as to rotate therewith. They are relatively axially movable, for varying the width of groove 20—21. They are urged constantly toward each other by compression springs 12 and 13. One end of each of these compression springs abuts a flange such as 14 or 15 formed respectively on collars 16 and 17. The inner ends of the springs 12 and 13 surround the hubs of the sections 5 and 6 and abut against the corresponding end surfaces thereof. In the position of the apparatus illustrated in Fig. 1, the springs 12 and 13 are compressed to a maximum, the collars 16 and 17 being in contact respectively with the ends of the hubs of sections 5 and 6. Accordingly, the separation of sections 5 and 6 is a maximum, and the width of groove 20—21 is a maximum.

The wheel element 5—6 is urged by the springs 12, 13, into driving contact with the tapered wheel structures 18—19 that are arranged for planetary motion about the axis of shaft 1. The groove 40—41 serves as a stop against which the wheel structures 18—19 are also urged by the action of these springs. Accordingly, assuming that wheel sections 3 and 4 are maintained against rotation, and sections 5 and 6 are rotated by shaft 1, then the structures 18—19 will roll around the groove 20—21.

The wheel sections 3 and 4 are arranged to be adjusted in an axial direction with respect to each other, as by the aid of a plurality of right and left hand lead screws 22. Three such lead screws are illustrated and are shown as journaled in the flanges 7 and 9. They engage correspondingly threaded apertures in the sections 3 and 4. When the lead screws 22 are rotated, the sections 3 and 4 are caused to move toward or from each other. In order to limit the separation of the sections 3 and 4, stop collars 23 may be utilized to form an abutment for the left hand edge of the section 3 as illustrated in Fig. 3. This figure illustrates the maximum separation of these sections 3 and 4.

Collars such as 24 may also be utilized for restraining axial movement of the lead screws 22. Each of the lead screws is furthermore provided with a pinion 25, each in mesh with a freely rotatable gear 26 mounted for rotation on the axis of shaft 1. One of the lead screws may be provided with an extension 27 to which a handle 28 may be attached. As the handle 28 is rotated, all three lead screws 22 are correspondingly operated by the aid of the intervening gearing.

In order to adjust the ratio of the drive, the handle 28 is operated. As the sections 3 and 4, for example, are brought together, the wheel structures 18—19 are moved toward the axis of shafts 1 and 2, because groove 40—41 is made narrower; and the sections 5 and 6 are urged farther apart by the wedging action of the structures 18—19, acting in opposition to the springs 12 and 13. As before stated, the sections 5 and 6 are shown in Fig. 1 as being at a maximum separation, the springs 12 and 13 being compressed and the hub of sections 5 and 6 abutting collars 16 and 17.

Since wheel sections 3 and 4 are stationary, they form a track upon which the conical surfaces 18 and 19 may roll. Thus they are placed in driving relation to the track or groove 40—41. The planetary rotation of the wheel structures 18—19, however, is determined also by the rate of rotation of the driving shaft 1. With the wheels 3—4 and 5—6 in the position illustrated in Fig. 1, the conical elements 18 and 19 are rotated about their own axes at a maximum rate. Accordingly, they will roll around the groove formed by the sections 3 and 4 at a maximum rate. This planetary action is translated to a rotary motion of shaft 2.

For this purpose a spider structure 29 for rotatably supporting one or more of the wheel structures 18—19 is provided. This spider includes the three arms 30, 31 and 32 (Fig. 3). Overlying these arms is a flange 33 slotted as illustrated at 34 for the accommodation of the bearing blocks 35 in which the shafts 36 of the conical roller wheel structures are accommodated. The spider structure 29 is shown as provided with a hub 37 rotatably mounted in the hub 10 and keyed as by key 38 to the driven shaft 2.

By virtue of the provision of the slots 34, the radial spacing from the axis of the conical rollers 18 and 19 to the axis of shaft 1 may be varied as required by the adjustment of the non-rotary wheel sections 3 and 4.

The ratio of transmission between shaft 1 and 2 depends upon the diameter of those parts of the conical surfaces 18 and 19 that are in contact with groove 20—21. The smaller this diameter, the greater the ratio of transmission, because the greater the angular motion of wheels 18—19 for the same linear roll. The ratio of transmission can be made to approach unity by designing the apparatus so that the effective diameters of the grooves 20—21 and 40—41 are as nearly equal in size as possible. This limit is never attained for an annular space must be left for the accommodation of the wheel structures 18—19.

The minimum ratio of transmission occurs when the groove 20—21 is narrowest (Fig. 3), thereby causing the sides 20 and 21 to contact the rollers 18 and 19 near their maximum diameters. The flange 33, however, limits the approach of the wheel sections 5 and 6 toward each other. The wheel sections 3 and 4 have been separated so as to interrupt the driving relation between them and the conical surfaces 18 and 19. Accordingly, no driving force is available for rotation of shaft 2. This is of use when it is desired to disconnect the load entirely.

It may be noted that there is no unbalancing of the machanism. Although only three wheel structures 18—19 are shown in the present instance, more or less may be used without departing from the mode of operation.

What is claimed is:

1. In apparatus of the character described, a pair of coaxial wheel elements, each element having a pair of relatively axially movable sections defining a groove of variable width, and a tapered rolling wheel structure in driving contact with both said grooves and fixed against axial movement, said structure being supported for planetary motion about the axis of the wheel elements.

2. In apparatus of the character described, a pair of coaxial wheel elements, each element having a pair of relatively axially movable sections defining a groove of variable width, one of said elements being non-rotary, a tapered rolling wheel structure in driving contact with both said grooves, and arranged for planetary motion about the axis of the wheel elements, and means for positively adjusting the axial positions of at least one pair of said sections by equal and opposite amounts.

3. In apparatus of the character described, a pair of coaxial wheel elements, each element having a pair of relatively axially movable sections defining a groove of variable width, one of said elements being non-rotary, a tapered rolling wheel structure in driving contact with both said grooves, and a support, rotary about the common axis, for said structure, said support and wheel structure being fixed against axial movement.

4. In apparatus of the character described, a pair of coaxial wheel elements, each element having a pair of relatively axially movable sections defining a groove of variable width, one of said elements being non-rotary, a tapered rolling wheel structure in driving contact with both said grooves, and arranged for planetary motion about the axis of the wheel elements, means for positively adjusting the axial positions of one set of sections by equal and opposite amounts, and means resiliently urging the other set of sections toward each other.

5. In apparatus of the character described, a pair of coaxial wheel elements, each element having a pair of relatively axially movable sections defining a groove of variable width, one of said elements being non-rotary, a tapered rolling wheel structure in driving contact with both said grooves, a support, rotary about the common axis, for said structure, means for positively adjusting the axial positions of one set of sections by equal and opposite amounts, and means resiliently urging the other set of sections toward each other.

6. In apparatus of the character described, a pair of coaxial wheel elements, each element having a pair of relatively axially movable sections defining a groove of variable width, one of said elements being non-rotary, one or more double cone rolling wheel structures in driving contact with both said grooves, said wheel structures being fixed against movement in an axial direction, and supported for planetary motion about the axis of the wheel elements.

7. In apparatus of the character described, a pair of coaxial wheel elements, each element having a pair of relatively axially movable sections defining a groove of variable width, one of said elements being non-rotary, one or more double cone rolling wheel structures in driving contact with both said grooves, and means for simultaneously widening one groove and narrowing the other, said wheel structures being fixed against movement in an axial direction, and supported for planetary motion about the axis of the wheel elements.

8. In apparatus of the character described, a pair of coaxial wheel elements, each element having a pair of relatively axially movable sections defining a groove of variable width, one of said elements being non-rotary, and a tapered rolling wheel structure in driving contact with both said grooves, means to support adjustably the non-rotary elements comprising a plurality of rods spaced from the axis of said elements and parallel with the axis, at least one of said rods having threaded portions respectively engaging each element, the threads on the different portions being oppositely directed.

STOVER C. WINGER.
LESLIE K. LOEHR.